(12) United States Patent
Xiao

(10) Patent No.: US 8,534,757 B2
(45) Date of Patent: Sep. 17, 2013

(54) CHILD SAFETY SEAT AND ITS INSTALLATION METHOD

(75) Inventor: Xiao-Hong Xiao, Central Hong Kong (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 356 days.

(21) Appl. No.: 12/859,442

(22) Filed: Aug. 19, 2010

(65) Prior Publication Data

US 2011/0049952 A1 Mar. 3, 2011

(30) Foreign Application Priority Data

Aug. 31, 2009 (TW) .............................. 98129311 A

(51) Int. Cl.
*A47D 1/10* (2006.01)
(52) U.S. Cl.
USPC ................................ 297/256.14; 297/256.13
(58) Field of Classification Search
USPC .................. 297/250.1, 256.14, 256.16, 463.1, 297/463.2, 256.13
See application file for complete search history.

(56) References Cited

U.S. PATENT DOCUMENTS

| 5,524,965 A * | 6/1996 | Barley ..................... 297/256.16 |
| 5,567,007 A | 10/1996 | Czernakowski et al. |
| 6,554,358 B2 | 4/2003 | Kain |
| 6,672,663 B2 | 1/2004 | Kain |
| 2008/0030055 A1 | 2/2008 | Renaudin |

FOREIGN PATENT DOCUMENTS

| CN | 101508254 A | 8/2009 |
| EP | 0432198 A1 | 6/1991 |
| EP | 0732235 A2 | 9/1996 |
| EP | 0732235 A3 | 5/1997 |
| EP | 0779175 A1 | 6/1997 |
| EP | 1882608 A2 | 1/2008 |
| JP | 2001301500 A | 10/2001 |
| JP | 2005508780 A | 4/2005 |

* cited by examiner

*Primary Examiner* — Milton Nelson, Jr.
(74) *Attorney, Agent, or Firm* — Baker & McKenzie LLP; David I. Roche

(57) ABSTRACT

A child safety seat comprises a seat portion including a seat bottom and a backrest, and a first and second rail section disposed parallel on a rear of the seat portion at left and right sides, respectively, each of the first and second rail sections including a first rail portion located on a rear of the backrest and a second rail portion located below the seat bottom. The first rail portion includes a first anchoring slot, and the second rail portion includes a second anchoring slot, the first and second anchoring slots adapted to hold spaced-apart portions of a seat belt. In addition, a method for installing the child safety seat is also described.

14 Claims, 5 Drawing Sheets

CHILD SAFETY SEAT AND ITS INSTALLATION METHOD

CROSS-REFERENCE TO RELATED APPLICATION

This application claims priority of Taiwan application no. 098129311 filed on Aug. 31, 2009.

BACKGROUND OF THE INVENTION

1. Field of the Invention

The present invention relates to a child safety seat, and more particularly to an adjustable child safety seat and its installation method.

2. Description of the Related Art

Conventionally, an automobile vehicle has seat belts provided at the front and rear seats. Each seat belt generally includes a shoulder strap and a lap strap connected with a tongue plate. The shoulder strap extends over a shoulder of the seated passenger in a diagonal direction, whereas the lap strap extends over a waist of the passenger. Once attached, the seat belt can secure the passenger against harmful movement that may result from a collision or a sudden stop of the vehicle.

However, the use of the conventional seat belt is not adapted for a young child who has a smaller body and may not be able to sustain the sudden pressure applied by the seat belt when a collision or sudden stop of the vehicle occurs. As a result, current safety legislations usually require the use of a child safety seat for seating a young child in a vehicle. The seat belt of the vehicle can be used to secure the child safety seat, which is more adapted to provide protection for the young child.

The current design of the child safety seat usually includes a seat portion and a base connected underneath the seat portion. For securing the child safety seat, the seat belt has to respectively engage with the seat portion and the base. With such installation method, the occurrence of a collision or sudden stop of the vehicle may affect the connection between the seat portion and the base, rendering the child safety seat unstable and creating potential risks for the child seated therein.

Therefore, there is a need for a child safety seat that can be safer in use and address at least the foregoing issues.

SUMMARY

The present application describes a child safety seat and its installation method. More specifically, the child safety seat can be adjusted to a forward position at a first angle of inclination, and a rearward position having a second angle of inclination greater than the first angle of inclination. The child safety seat includes a harness anchoring structure through which a seat belt of a vehicle can be engaged for securely positioning the child safety seat in the vehicle.

In some embodiment, the child safety seat comprises a seat portion including a seat bottom and a backrest, and a first and second rail section disposed parallel on a rear of the seat portion at left and right sides, respectively, each of the first and second rail sections including a first rail portion located on a rear of the backrest and a second rail portion located below the seat bottom. The first rail portion includes a first anchoring slot, and the second rail portion includes a second anchoring slot, the first and second anchoring slots adapted to hold spaced-apart portions of a seat belt.

In other embodiments, a method of installing the child safety seat is described. The method comprises placing the child safety seat in a rearward position, attaching a seat belt, wherein the seat belt includes a lap strap and a shoulder strap, engaging the lap strap through the second anchoring slots of the first and second rail sections, and wrapping the shoulder strap around a rear of the backrest, and engaging the shoulder strap through the first anchoring slot of the first rail section.

At least one advantage of the child safety seat and installation method described herein is the ability to provide two harness anchoring structures through which a seat belt of a vehicle can respectively engage for effectively securing the child safety seat in the vehicle. The seat belt can be easily engaged and held in either of the two harness anchoring structures, depending on whether the seat is installed in a forward or rearward position.

DETAILED DESCRIPTION OF THE EMBODIMENTS

The present application describes a child safety seat and its installation method. More specifically, the child safety seat can be adjusted to a forward position at a first angle of inclination, and a rearward position having a second angle of inclination greater than the first angle of inclination. The child safety seat includes a harness anchoring structure through which a seat belt of a vehicle can be engaged for securely positioning the child safety seat in the vehicle.

Figure 1:
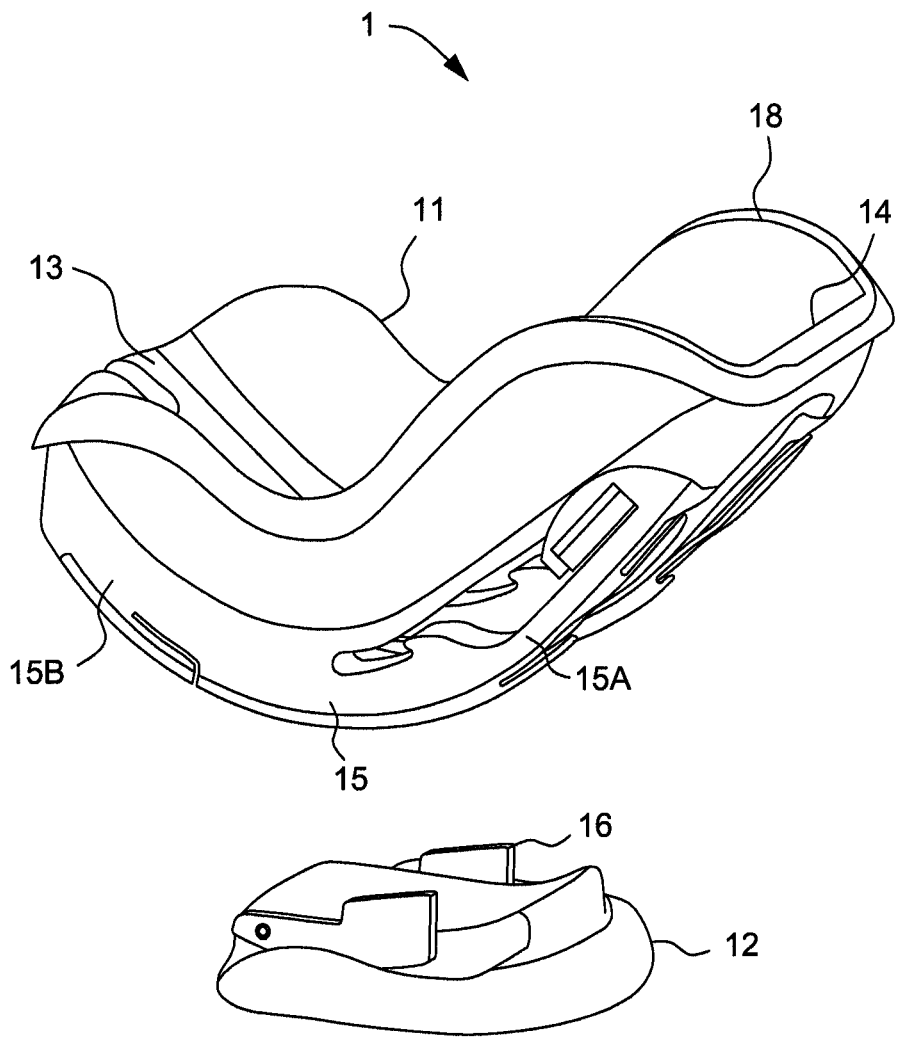
FIG. 1 is a schematic view illustrating one embodiment of a child safety seat.

FIG. 1 is a schematic view illustrating one embodiment of a child safety seat 1. The child safety seat 1 comprises a seat portion 11 and a base 12. The seat portion 11 can be movably assembled on the base 12 in a permanent manner, i.e., the seat portion 11 cannot be detached from the base 12 in use. The seat portion 11 includes a seat bottom 13, a backrest 14, and two rail sections 15 protruding parallel with each other from a rear of the seat portion 11. In one embodiment, the seat portion 11, including the seat bottom 13, the backrest 14 and the two rail sections 15, can be formed in a single shell body by plastics molding. Each of the left and right sides of the base 12 respectively includes a flange 16 protruding upward, whereas a lower portion of the backrest 14 proximate to the seat bottom 13 has a rear surface provided with recessed cavities 17 (FIG. 2) in which the flanges 16 can be lodged in a movable manner. As a result, adjusting the position of the seat portion 11 relative to the base 12 creates relative motion of the flanges 16 in the recessed cavities 17.

The seat bottom 13 and the backrest 14 partially delimit a volume adapted to receive the placement of a child. The concave angle between the seat bottom 13 and the backrest 14 can provide optimal comfort for a child installed in a seating or laid-down position. In one embodiment, the interior side of the seat bottom 13 and backrest 14 can include a cushion 18 made of a flexible material. The cushion 18 can have a generally L-shaped cross-section with two lateral protruding lobe portions for absorbing shocks.

Figure 2:
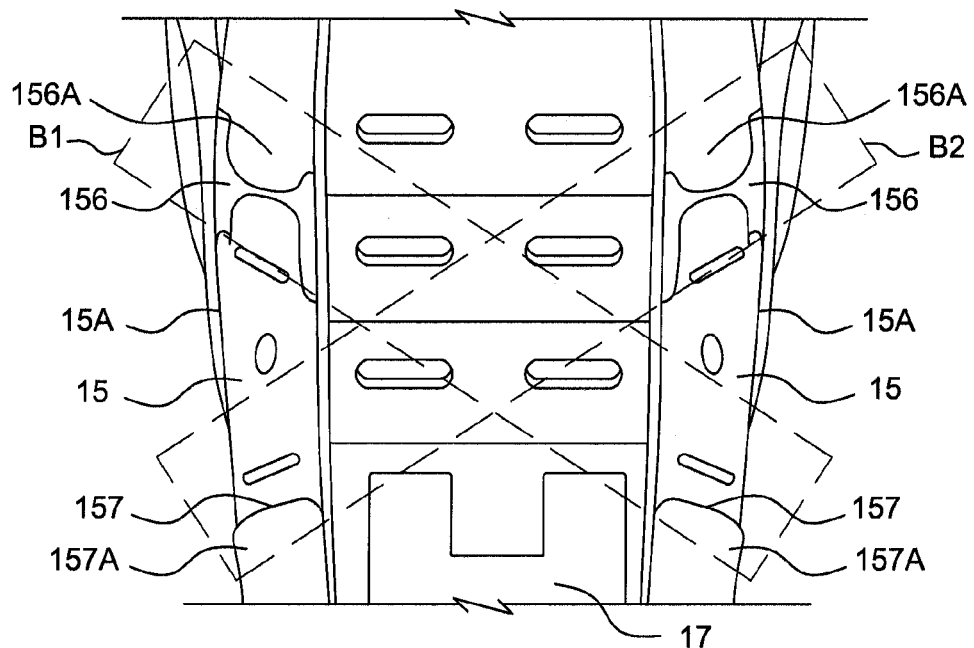
FIG. 2 is a partially enlarged view illustrating a rear side of the child safety seat shown in FIG. 1.
Figure 3:
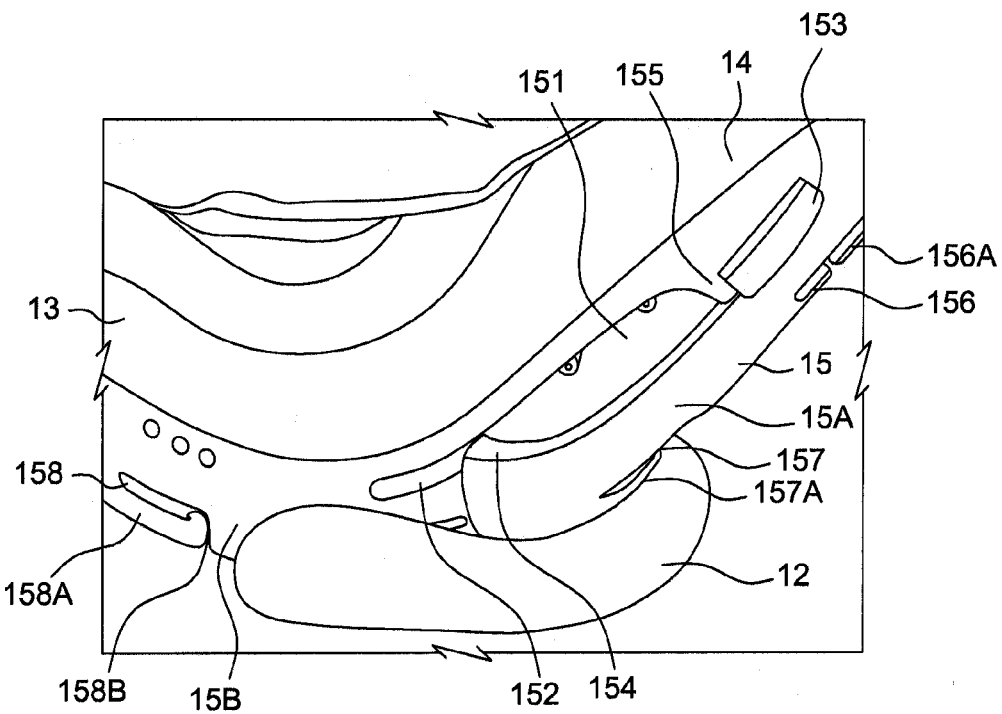
FIG. 3 is a partially enlarged view illustrating a lateral side of the child safety seat shown in FIG. 1.

The rail sections 15 can be formed with the seat portion 11 in a single body. The rail sections 15 can be disposed at left and right sides and protrude from a lower surface of the seat bottom 13, extending parallel on a rear surface of the backrest 14 to the lower surface of the seat bottom 13. Each of the two rail sections 15 includes a first rail portion 15A protruding from the rear of the backrest 14, and a second rail portion 15B protruding from a lower surface of the seat bottom 13. As shown in FIGS. 2 and 3, the first and second rail portions 15A and 15B of each rail section 15 respectively include a harness anchoring structure. In use, a seat belt of a vehicle (e.g., automobile) can be engaged and held through the harness anchoring structure so as to restrainedly secure the child safety seat 1.

FIGS. 2 and 3 are partially enlarged views respectively illustrating a rear and lateral side of the child safety seat 1. As shown in FIG. 3, the first rail portion 15A includes an opening 151, an anchoring slot 152 located below the opening 151, and an anchoring slot 153 located above the opening 151. The opening 151 and anchoring slots 152 and 153 cross each rail section 15 in a transversal direction, such that the opening 151 and anchoring slots 152 and 153 are substantially enclosed in the solid matter of the rail sections 15. A boundary sidewall between the anchoring slot 152 and the opening 151 is at least partially formed by a rib 154. The rib 154 does not entirely close the boundary between the anchoring slot 152 and opening 151, and at least partially forms a throttle through which the anchoring slot 152 and opening 151 can communicate with each other. It will be appreciated that aside the rib 154, other structures may be used for allowing the anchoring slot 152 and opening 151 to selectively communicate with each other, e.g., by using a movable arm that can obstruct and open the connection between the first anchoring slot 152 and opening 151 (not shown).

As shown, a rib 155 is also used to at least partially form a boundary sidewall between the anchoring slot 153 and opening 151. The rib 155 does not entirely close the boundary between the second anchoring slot 153 and opening 151, and at least partially forms a throttle through which the anchoring slot 153 and opening 151 can communicate with each other. It will be appreciated that aside the aforementioned rib 155, other structures may also be used for allowing the anchoring slot 153 and opening 151 to selectively communicate with each other, e.g., by using a movable arm that can obstruct and open the connection between the anchoring slot 153 and opening 151 (not shown). Other than the connection between the opening 151 and the anchoring slots 152 and 153, the opening 151, and anchoring slots 152 and 153 are entirely surrounded by the material of the rail portion 15. The opening 151 and anchoring slots 152 and 153 form a first harness anchoring structure through which a seat belt can engage for securing the child safety seat 1 in a forward position.

As shown in FIGS. 2 and 3, a rear outer surface of the first rail portion 15A also includes a plurality of anchoring slots, such as anchoring slots 156 and 157. The anchoring slots 156 and 157 are placed one above the other along each rail section 15. A rear side of the anchoring slots 156 and 157 is partially closed by rear sidewalls 156A and 157A. The sidewalls 156A and 157A do not entirely close the anchoring slots 156 and 157, such that the shoulder strap of a seat belt can be wrapped around the rear of the child safety seat 1 and held in a diagonal direction through the anchoring slot 156 of one rail section 15 and the anchoring slot 157 of the opposite rail section 15 (the dotted lines show different shoulder straps B1 and B2 engaged in two different directions through the anchoring slots 156 and 157).

It is worth noting that the distance between the anchoring slots 156 and 157 of each rail section 15 can be modified and increased so that the shoulder strap B1 or B2, once engaged through the anchoring slots 156 and 157, can contact and wrap around a larger area on the rear of the child safety seat 1. Accordingly, the shoulder strap B1 or B2 can retain the child safety seat 1 more firmly. In one embodiment, the opening 151 and anchoring slots 152, 153, 156 and 157 can all be disposed along a rear region of the backrest 14. Furthermore, the anchoring slot 156 can be disposed at a first height that approximately corresponds to that of the anchoring slot 152, whereas the anchoring slot 157 can be disposed an upper second height that approximately corresponds to that of the anchoring slot 153, the anchoring slots 152 and 153 being formed within the thickness of each rail section 15 and the anchoring slots 156 and 157 being formed on an outer surface of each rail section 15.

Referring to FIG. 3 again, the second portion 15B of each rail section 15 can include another anchoring slot 158 located below the seat bottom 13. A lower side of the anchoring slot 158 is partially closed by a lower sidewall 158A and can include a gap 158B that communicates with the interior of the anchoring slot 158 and provides an opening to the anchoring slot 158 from the bottom of the seat portion 11. As a result, a lap strap of a seat belt can be passed through the gap 158B from the bottom of the seat portion 11 and retained horizontally through the anchoring slots 158 of the two rail sections 15. The anchoring slots 156, 157 and 158 form a second harness anchoring structure through which a seat belt can engage for securing the child safety seat 1 in a rearward position.

Figure 4:
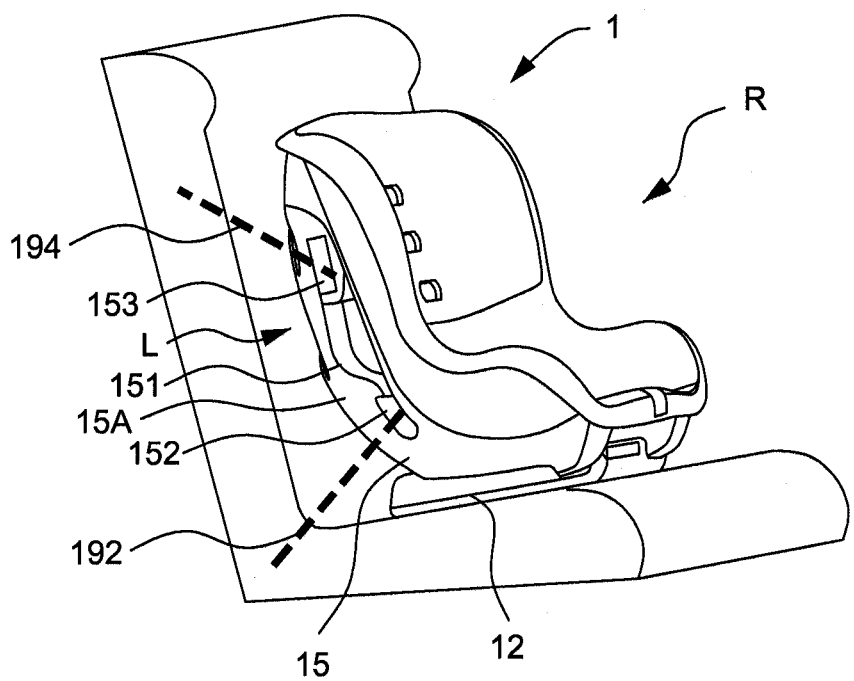
FIG. 4 is a schematic view illustrating a first side of the child safety seat installed in a forward position.
Figure 5:
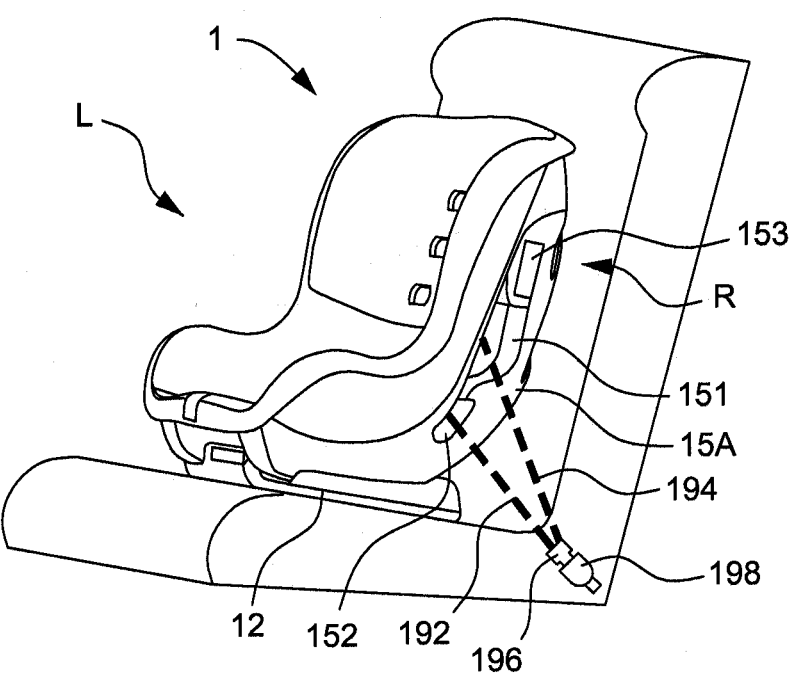
FIG. 5 is a schematic view illustrating a second side of the child safety seat installed in a forward position.
Figure 6:
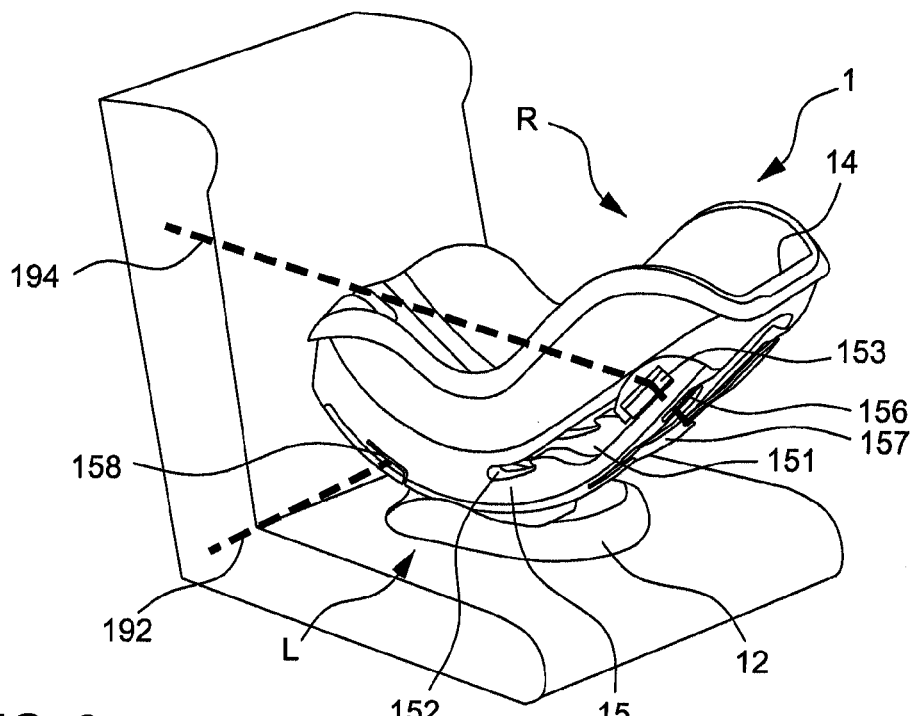
FIG. 6 is a schematic view illustrating a first side of the child safety seat installed in a rearward position.
Figure 7:
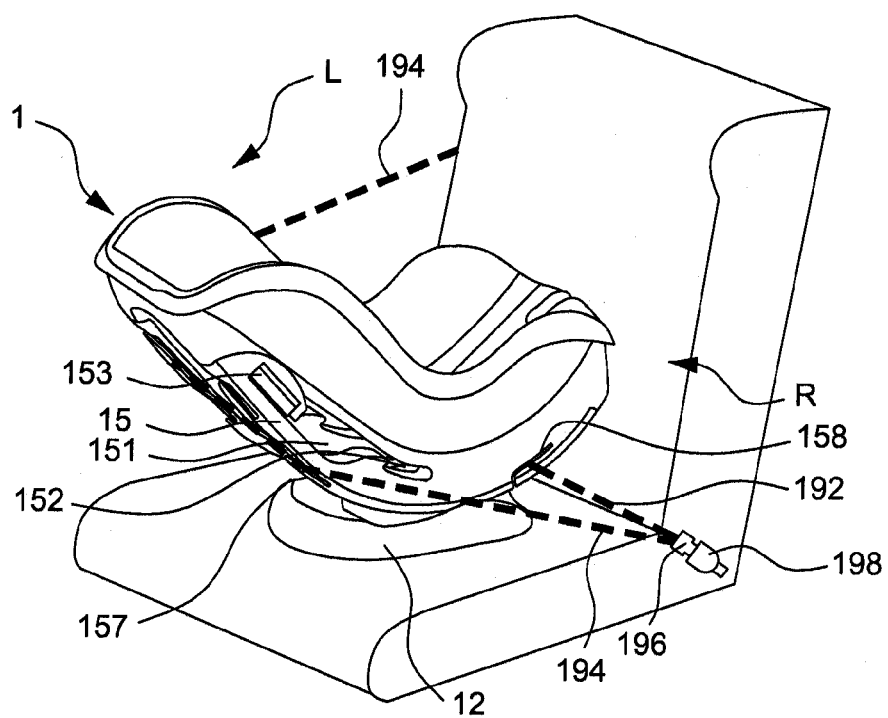
FIG. 7 is a schematic view illustrating a second side of the child safety seat installed in a rearward position.

Each rail section 15, including the opening 151 and anchoring slots 152, 153, 156 and 157, can be disposed in symmetrical arrangement at left and right positions on the rear/bottom of the seat portion 11. As shown in FIGS. 4 and 5, when the child safety seat 1 is installed in a forward position on the seat of a vehicle (i.e., the front of the child safety seat 1 is oriented toward the front of the vehicle), the seat belt of the vehicle can be engaged and held through the opening 151, the anchoring slots 152 and 153 for securing the child safety seat 1. As shown in FIGS. 6 and 7, when the child safety seat 1 is installed in a rearward position on the seat of the vehicle (i.e., the front of the child safety seat 1 is oriented toward the rear of the vehicle), the seat belt of the vehicle can be engaged and held through the anchoring slots 156, 157 and 158 for securing the child safety seat 1.

FIGS. 4 and 5 are schematic views illustrating the child safety seat 1 installed in a forward position. In FIGS. 4 and 5, the seat belt is drawn with dotted lines, including a lap strap 192, a shoulder strap 194, and a tongue plate 196 connecting between the lap strap 192 and the shoulder strap 194. Once the child safety seat 1 is put in place on the seat of the vehicle, the seat belt of the vehicle (including the shoulder and lap strap) can be passed through the first rail portion 15A located on a first side L (e.g., left side) of the seat 1, and the tongue plate 196 then can be pulled out through the rail section 15 on the second side R (e.g., right side) opposite the first side L and attached with a buckle 198. In this manner, the lap strap 192 can be positioned in a generally horizontally direction through the two first rail portions 15A, and is securely engaged and held through the anchoring slots 152 of the two rail sections 15. As to the shoulder strap 197, a distal portion of the shoulder strap 194 remote from the tongue plate 196 (i.e., proximate to the rail section 15 on the first side L) can be engaged and held through the anchoring slot 153 of the rail section 15 on the first side L, whereas a proximal end of the shoulder strap 194 (i.e., proximate to the second side R) can pass through the opening 151 of the rail section 15 on the second side R. The seat belt can thereby retain the child safety seat 1 at both the seat portion 11 and backrest 14 without interfering with the locking position and angular inclination between the seat portion 11 and the base 12. Accordingly, the child safety seat 1 can be restrained in place in a stable and secure manner.

FIGS. 6 and 7 are schematic views illustrating the child safety seat 1 installed in a rearward position. In FIGS. 6 and 7, the seat belt is likewise drawn with dotted lines. First, the child safety seat 1 is placed in a rearward oriented position, and the tongue plate 196 of the seat belt is fastened with the buckle 198. While the child safety seat 1 rests in a rearward position, the seat portion 11 is preferably adjusted to a reclined position having a greater angular inclination relative to the base 12 for ensuring better stability. Then, the lap strap 192 is engaged and held through the anchoring slots 158 of the two rail sections 15 in a horizontal direction. As to the shoulder strap 194, it is pulled toward the rear of the seat portion 11 to wrap around the rear of the backrest 14. A first portion of the shoulder strap 194 is then engaged and held through the anchoring slot 156 of the rail section 15 on the first side L, and a second portion of the shoulder strap 194 is engaged and held through the anchoring slot 157 of the rail section 15 on the second side R. As a result, the intermediate portion of the shoulder strap 194 located between the two rail sections 15 lies in a diagonal direction for providing a restraining action on the backrest 14, whereas the lap strap 192 applies a restraining action on the seat bottom 13.

Because the anchoring slots 156, 157 and 158 are disposed in symmetrical pairs along the two parallel rail sections 15, the child safety seat 1 can be securely harnessed in either a left or right position on the seat of the vehicle (i.e., with the lap strap 192 and shoulder strap 194 pulled from the first side L to the second side R for attaching with the buckle 198, or reversely). Moreover, as the shoulder strap 194 is secured in a diagonal direction and the anchoring slot 156 provides an anchoring point that is higher than the anchoring point of the slot 158, the child safety seat 1 can be retained with more balanced, scattered tension distribution along the seat belt.

Figure 8:
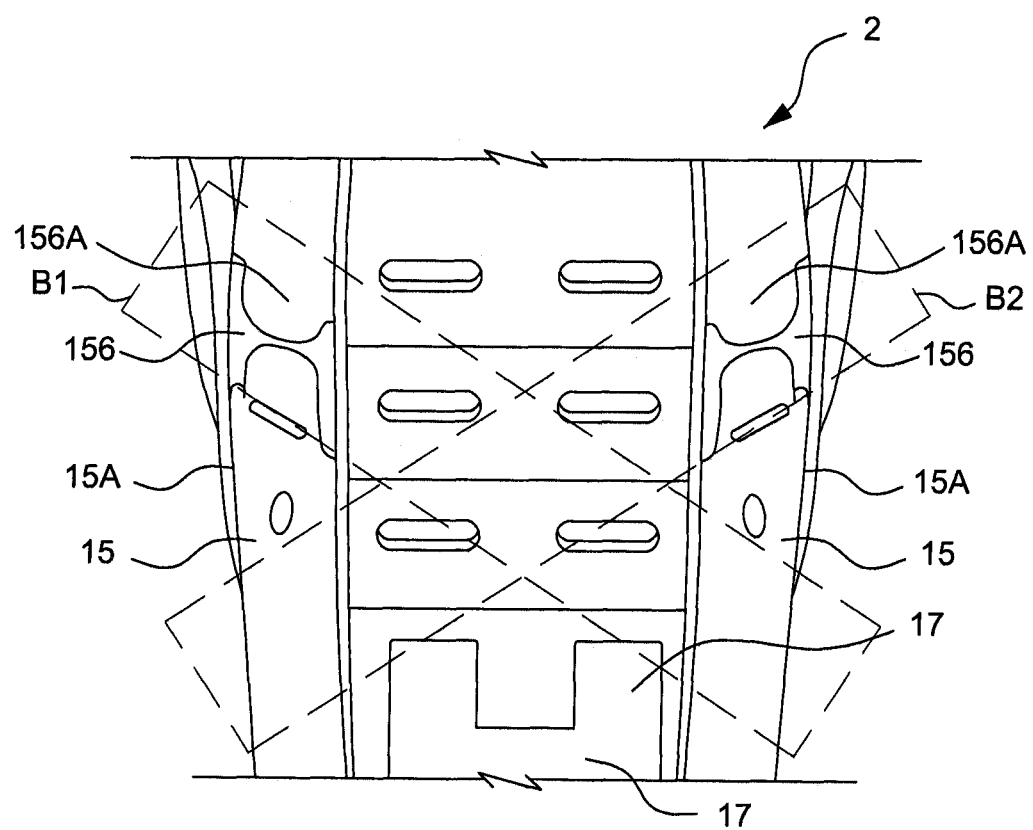
FIG. 8 is a schematic view illustrating another embodiment of a child safety seat.

FIG. 8 is a schematic view illustrating another embodiment of a child safety seat 2. The child safety seat 2 shown in FIG. 8 is very similar to the embodiment shown previously. One main difference lies in the two rail sections 15 do not have the anchoring slots 157 (as shown in FIG. 2). In other words, when the child safety seat 2 is used in a rearward position, the shoulder strap B1 (or B2) can wrap around a rear of the backrest, and is engaged and held in the anchoring slot 156 only. As to the lap strap, it can be engaged and held horizontally through the anchoring slots 158 of the two rail sections 15, at a position lower than the anchoring point of the anchoring slot 156.

As described above, at least one advantage of the child safety seat and installation method described herein is the ability to provide two harness anchoring structures through which a seat belt of a vehicle can respectively engage for effectively securing the child safety seat in the vehicle. The seat belt can be easily engaged and held in either of the two harness anchoring structures, depending on whether the seat is installed in a forward or rearward position.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A child safety seat adapted for use in a vehicle, comprising:
    a seat portion, including a seat bottom and a backrest; and
    a first and a second rail section, wherein the first and second rail sections are disposed parallel on a rear of the seat portion at left and right sides, respectively, each of the first and second rail sections including a first rail portion located on a rear of the backrest and a second rail portion located on a lower side of the seat bottom;
    wherein the first rail portion in one or two of the first and second rail sections includes a first anchoring slot and a third anchoring slot spaced apart from each other in a vertical direction, and the second rail portion in one or two of the first and second rail sections includes a second anchoring slot, the first, second and third anchoring slots being adapted to hold spaced-apart portions of a seat belt of the vehicle;
    wherein when the child safety seat is installed in a rearward position, the first anchoring slot of the first rail section and the third anchoring slot of the second rail section are adapted to hold a shoulder strap of a seat belt that is wrapped in a diagonal direction around the first rail portions of the first and second rail sections.

2. The child safety seat according to claim 1, wherein when the child safety seat is installed in the rearward position, the second anchoring slots of the two rail sections are adapted to hold a lap strap of a seat belt.

3. The child safety seat according to claim 1, wherein the first and second rail sections protrude from the rear of the seat portion, and extend parallel from the rear of the backrest to the lower side of the seat bottom.

4. The child safety seat according to claim 1, wherein the seat portion is movably connected with a base.

5. The child safety seat according to claim 1, wherein the first and second rail sections, including the first and second anchoring slots, are disposed symmetrical at the left and right sides on the rear of the seat portion.

6. The child safety seat according to claim 1, wherein the second anchoring slot in the second rail portion is partially closed by a lower sidewall and has an opening accessible from a bottom of the seat portion.

7. The child safety seat according to claim 1, wherein the first rail portion further includes an opening, a lower anchoring slot located below the opening, and an upper anchoring slot located above the opening, the lower and upper anchoring slots being spaced apart from the first to third anchoring slots.

8. The child safety seat according to claim 7, wherein when the child safety seat is installed in a forward position in a vehicle, the lower anchoring slots of the first and second rail sections are adapted to hold a lap strap of a seat belt in the vehicle.

9. The child safety seat according to claim 7, wherein when the child safety seat is installed in a forward position in a vehicle, the upper anchoring slot of the first rail section is adapted to hold a shoulder strap of a seat belt in the vehicle.

10. A method for installing a child safety seat, wherein the child safety seat includes a seat portion having a seat bottom and a backrest, and a first and second rail section disposed parallel on a rear of the seat portion, each of the first and second rail sections including a first rail portion located on a rear of the backrest and having a first anchoring slot and a third anchoring slot vertically spaced apart from each other, and a second rail portion located below the seat bottom and having a second anchoring slot, the method comprising:

placing the child safety seat in a rearward position;
attaching a seat belt, wherein the seat belt includes a lap strap and a shoulder strap;
engaging the lap strap through the second anchoring slots of the first and second rail sections; and
wrapping the shoulder strap around a rear of the backrest, and engaging the shoulder strap through the first anchoring slot of the first rail section; and
engaging the shoulder strap through the third anchoring slot.

11. The method according to claim 10, wherein the shoulder strap lies in a diagonal direction between the first anchoring slot of the first rail section and the third anchoring slot of the second rail section.

12. The method according to claim 10, wherein the first and second rail sections, including the first and second anchoring slots, are disposed symmetrical at left and right sides on the rear of the seat portion.

13. The method according to claim 10, wherein the seat portion is movably connected with a base.

14. The method according to claim 13, wherein the step of placing the child safety seat in a rearward position comprises adjusting the seat portion to an inclined position relative to the base.

* * * * *